United States Patent

Struger et al.

[15] 3,646,360
[45] Feb. 29, 1972

[54] DATA INTERPRETATION NETWORK

[72] Inventors: Odo J. Struger, Milwaukee; William W. Kiffmeyer, Bayside; Loren E. Shaum, Brookfield, all of Wis.

[73] Assignee: Allen-Bradley Company, Milwaukee, Wis.

[22] Filed: June 18, 1970

[21] Appl. No.: 47,206

[52] U.S. Cl. ........................307/233, 307/215, 307/210
[51] Int. Cl. ........................................................H03k 5/20
[58] Field of Search..............307/233, 210, 215, 217, 231, 307/232, 271, 296

[56] References Cited

UNITED STATES PATENTS

| | | | |
|---|---|---|---|
| 3,304,504 | 2/1967 | Horlander | 307/233 |
| 3,437,940 | 4/1969 | Hornoch | 307/233 |
| 3,460,043 | 8/1969 | Hsieh | 307/215 |
| 3,515,997 | 6/1970 | Rabany | 307/233 |
| 3,518,552 | 6/1970 | Carlow | 307/215 |
| 3,532,996 | 10/1970 | Wallace, Jr. | 307/215 |

OTHER PUBLICATIONS

NASA Tech. Brief " Unique Frequency Shift Keyed Demodulation System" Dec. 1967 Brief 67–10668

Primary Examiner—Donald D. Forrer
Assistant Examiner—R. E. Hart
Attorney—Thomas O. Kloehn and Arthur H. Seidel

[57] ABSTRACT

The outputs of four data interpretation circuits connect through a first and second OR gate to either a first or second monoshot circuit. The data interpretation circuits each receive two 90° phase displaced signals and their inversions from a position transducer attached to a numerically controlled machine. As the machine moves, these interpretation circuits detect voltage shifts in the position transducer signals and alternately fire the first and second monoshot circuits to generate a train of pulses at the output of the network as the machine moves. Each data interpretation circuit has two flip-flops each triggered by the output of one of two NAND gates. An output of each flip-flop is connected to an input of the NAND gate connected to the other flip-flop. This inhibits the actuation of one flip-flop after the other flip-flop is triggered and the machine remains within predetermined limits such as occurs during vibration.

6 Claims, 3 Drawing Figures

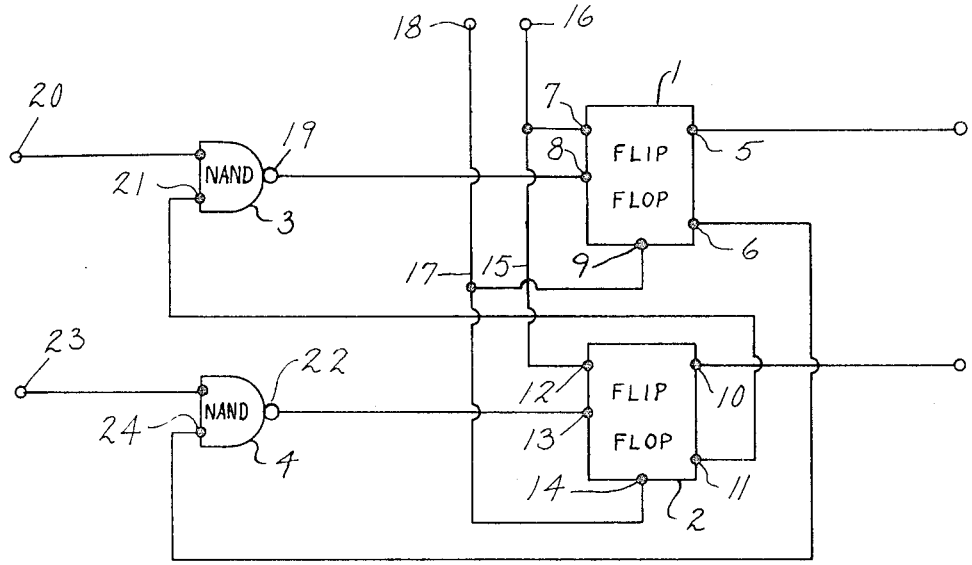
Fig.1
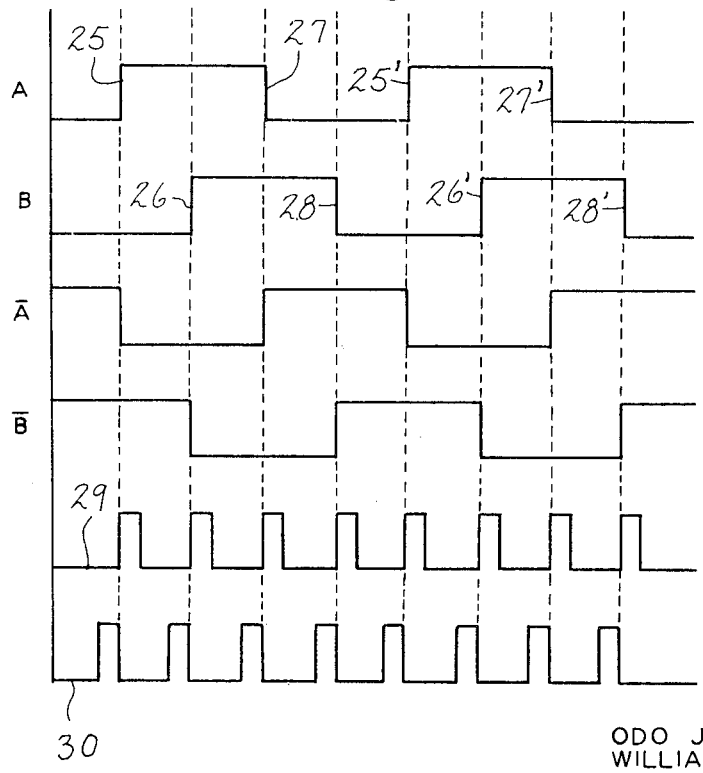
Fig.2
INVENTORS
ODO J. STRUGER
WILLIAM W. KIFFMEYER
LOREN E. SHAUM
BY 
ATTORNEY

DATA INTERPRETATION NETWORK

BACKGROUND OF THE INVENTION

In digital numerical control systems for use with machine tools, the position of the machine is determined by summing electrical pulses which represent increments of machine displacement. The resolution of the numerical control system, and consequently the accuracy of the machine, is determined by the magnitude of machine displacement necessary to generate a single pulse, or digit of information. In high-resolution systems, the position transducer used to generate these pulses or digits of information must be connected to sense minute machine movements.

Typically, the position transducer generates a signal which alternates between one voltage level (hi) and another voltage level (lo) periodically as a function of machine position. A logic circuit is attached to receive this transducer signal and generate a pulse each time the signal changes voltage level. These output pulses each represent a unit distance of machine displacement and are summed and stored by the control system to keep an up-to-date record of the present machine position. In a bidirectional system these pulses are continuously arithmetically added to the machine position dimension when the machine is moving in one direction and arithmetically subtracted from the position dimension when the machine is moving in the opposite direction. A missed pulse, or an additional pulse, introduces an error into the machine position dimension which is not self-correcting, and will result in an inaccuracy in the item being machined.

In the typical industrial environment in which the numerically controlled machine is operated, the machine shaft upon which the position transducer senses displacement, is subject to vibration. When higher resolution systems are used these vibrations become increasingly troublesome because the system is able to detect the small machine displacement occurring. More particularly, when the increment of machine displacement necessary to generate a pulse is decreased, it increases the probability that vibration will occur at a machine position at which the signal from the position transducer is changing voltage level. In an ideal system the train of pulses generated by the repeated change in voltage level as the machine vibrates about such a position will alternately be added and subtracted from the machine dimension with the result that the vibration will not produce any "miscounts." However, when the vibration exceeds the frequency response of the numerical control system, it will not respond fast enough to alternately add and subtract the pulses so generated. As a result, miscounts occur and an erroneous dimension is produced by the machine. In other words, the practical limits on the frequency response of the numerical control system often results in the introduction of erroneous information, or miscounts, when the machine vibrations are of sufficiently high frequency and the magnitude of vibrations becomes large relative to the incremental distance of machine displacement being sensed by the system.

An obvious solution to this problem is to proportionally increase the frequency response of the system, as the system resolution is increased. This obvious solution, however, becomes very expensive, and hence impractical, for high-resolution systems. Also, because of the complexity of the industrial environment there will always be a good chance that vibrations exceeding the frequency response of the logic system will be encountered.

Summary of the Invention

The invention relates to a data interpretation circuit which includes: a first flip-flop circuit having an output terminal which changes voltage when a phase displaced position transducer signal applied to a set terminal has a predetermined polarity, and a trigger signal is subsequently applied to a trigger set terminal; a second flip-flop circuit similar to the first and having its set terminal connected to the set terminal of the first flip-flop circuit; a first gate circuit connected to generate a trigger signal to the first flip-flop circuit when the position transducer signal received at a data input terminal has a predetermined voltage, and an inhibit input terminal connected to the output terminal of the second flip-flop circuit has a predetermined voltage; and a second gate circuit connected to generate a trigger signal to the second flip-flop circuit when the position transducer signal applied to its data input terminal has a predetermined polarity, and the output of the first flip-flop circuit applied to its inhibit input terminal has a predetermined voltage, such that when the predetermined conditions are met to cause one of the flip-flop circuits to trigger, a subsequent shift by either flip-flop output is inhibited until the voltage level of the phase displaced transducer signal shifts.

The present invention relates to a data interpretation network which is connected between the position transducer and the numerical control system to isolate the system from voltage shifts in the position transducer output signal caused by machine vibration. The invention contemplates the generation of a position transducer signal (A) which alternates in voltage level as a function of machine displacement. Concurrently, a phase displaced position transducer signal (B) is generated which is identical to, but phase displaced from, the position transducer signal (A). As the machine moves in one direction it passes over equally spaced points which cause the position transducer signal to shift. Equally spaced and located between these first points are machine positions in which the phase displaced transducer signal shifts in voltage. Consequently, there is a length of machine displacement on either side of the position transducer signal shift points in which the phase displaced position transducer signal remains constant. The object of the invention is to generate a voltage shift at an output terminal when the machine passes over a shift point, and inhibit the production of further voltage shifts at the output until the machine is displaced a sufficient distance to cause a shift in the phase displaced position transducer signal.

A more particular objective of the invention is to provide a circuit which generates a signal at one of two outputs when the following sequence occurs: the phase displaced position transducer signal applied to the circuit shifts to a predetermined level which sets the flip-flops; followed by a shift in the position transducer signal in one direction. The circuit generates a signal at the other output when the following occurs: the phase displaced position transducer signal shifts to the same predetermined level to set the flip-flops; followed by a shift in the position transducer signal in the opposite direction. When one of these output signals is generated the circuit does the following: retains that output until the phase displaced position transducer signal shifts level; and inhibits the generation of a signal at the other output until the phase displaced position transducer signal shifts level.

A more specific objective of the invention is to provide a circuit which, when combined with other similar circuits, forms a network which detects the four edges produced by the voltage shifts in two position transducer signals which are phase displaced from one another. Furthermore, it is an objective of the invented network so formed to generate pulses for use with a high-resolution numerical control system and to isolate the numerical control system from signals caused by machine vibration.

Other features, objectives and advantages of the invention will become apparent from the description to follow.

BRIEF DESCRIPTION OF THE DRAWINGS

FIG. 1 is an electrical circuit diagram of the data interpretation circuit;

FIG. 2 is a representation of various wave forms appearing in the data interpretation circuit of FIG. 1.

DESCRIPTION OF THE PREFERRED EMBODIMENT

Figure 3:
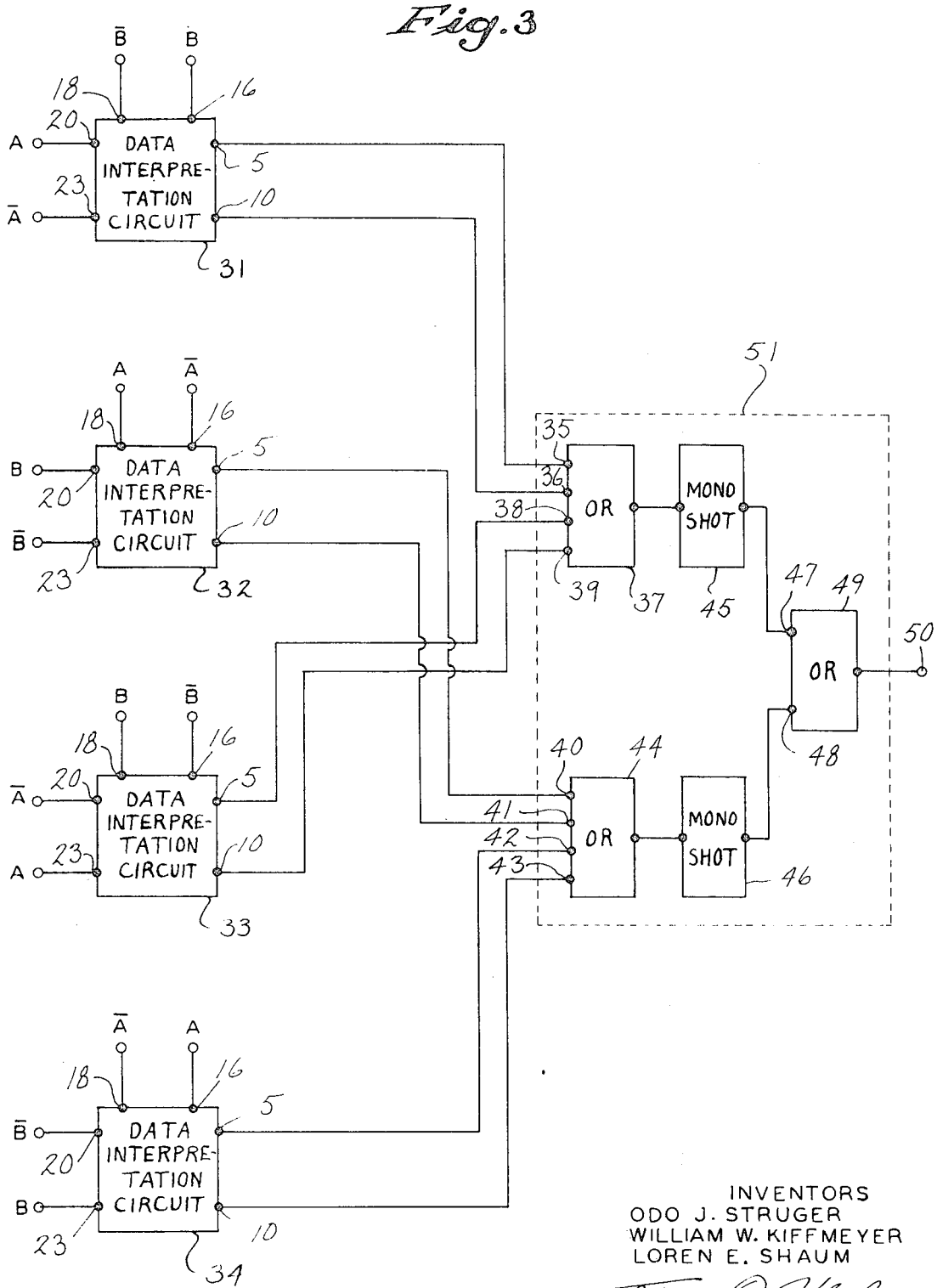
FIG. 3 is a block diagram of data interpretation network using the circuit of FIG. 1.

The data interpretation circuit shown in FIG. 1 is comprised of four basic elements; a first flip-flop 1, a second flip-flop 2, a first NAND-gate 3, and a second NAND-gate 4. The first flip-flop 1 has a standard circuit configuration familiar to those skilled in the art. It is a bistable multivibrator having a first output terminal 5 which is in either a low-voltage state, hereinafter referred to as "lo," or a high-voltage state, hereinafter referred to as "hi." A second flip-flop output terminal 6 has a similar output characteristic, but is constrained to be in a state opposite to that of first output terminal 5.

The voltage state of both output terminals 5 and 6 is determined by the voltage levels applied to three input terminals; a set terminal 7, a trigger set terminal 8, and a reset terminal 9. When a negative voltage is applied to the reset terminal 9, the first output terminal 5 goes lo and the second output terminal 6 goes hi. If the set terminal 7 is then maintained at a negative voltage and a negative voltage step, or trigger signal, is subsequently applied to the trigger set terminal 8, the first output terminal 5 will go hi and the second output terminal 6 will go lo. In order to change the state of the first flip-flop 1 outputs in this manner, however, it is imperative that the set terminal 7 be armed, or conditioned, at a negative voltage prior to the application of the trigger signal. After the first flip-flop 1 has been triggered it is reset to repeat the cycle. The terminology used in the above description applies to a standard RST flip-flop, however, the operation described also applies to a standard J-K flip-flop or other "clocked" flip-flop.

The second flip-flop 2 is identical to the first flip-flop 1. It has a first output terminal 10, a second output terminal 11, a set terminal 12, a trigger set terminal 13, and a reset terminal 14. The set terminals 7 and 12 on the two flip-flops 1 and 2 are connected together by a line 15 which terminates in a conditioning terminal 16. The reset terminals 9 and 14 are connected together by a line 17 which terminates in a recycle terminal 18.

The first NAND-gate 3 has a standard circuit configuration familiar to those skilled in the art. It will produce a negative trigger signal at its output 19 when positive voltages are concurrently applied to both a data input terminal 20 and an inhibit terminal 21. The output terminal 19 is connected to the trigger set terminal 8 on the first flip-flop 1, and the inhibit terminal 21 is connected to the second output terminal 11 on the second flip-flop 2. Likewise, the second NAND-gate 4 has an output terminal 22 which is connected to the trigger set terminal 13 on the second flip-flop 2 and an inhibit terminal 24 which is connected to the second output terminal 6 on the first flip-flop 1.

A cycle is initiated by a negative voltage applied to the recycling terminal 18 that drives the first output terminals 5 and 10 lo and the second output terminals 6 and 11 hi. Consequently, both inhibit terminals 21 and 24 on the NAND-gates 3 and 4 are hi. When a negative voltage is then applied to the conditioning terminal 16 the circuit is armed, or conditioned, to respond to a positive voltage applied to either the data input terminal 20 or the inverted data input terminal 23. If the data input terminal 20 goes hi the first NAND-gate 3 generates a negative trigger signal to the first flip-flop 1. This drives the first output terminal 5 hi and the second output terminal 6 lo. Because the second output terminal 6 is connected to the inhibit terminal 24 on the second NAND-gate 4, a negative voltage is now applied to the inhibit terminal 24 and the second NAND-gate 4 cannot generate a trigger signal to the second flip-flop 2. Consequently, in its triggered state, the first output terminal 5 of the first flip-flop 1 remains hi and the first output terminal 10 of the second flip-flop 2 is inhibited in its lo, or untriggered, state until a negative voltage is applied to the recycle terminal 18 resetting the first flip-flop 1. The same cycle can now repeat, or alternatively, a positive voltage can be applied to the inverted data input terminal 23, triggering the second flip-flop 2 causing its first output terminal 10 to go hi. When this occurs the second output terminal 11 of the second flip-flop 2 is driven lo which inhibits the generation of a trigger signal by the first NAND-gate 3 until a negative voltage is again applied to the recycle terminal 18.

It can be appreciated by those skilled in the art that gates other than a NAND gate can be used in the circuit. For example, if the trigger set terminal of the flip-flop used in the circuit is responsive to a positive trigger signal, AND gates can be substituted for the NAND-gates 3 and 4 in the circuit of FIG. 1. Likewise, the laws of DeMorgan and other Boolean algebra combination laws show that OR gates can be used. For proper circuit operation, it is only necessary to use a gate that will effectively prevent the generation of a trigger set signal to one flip-flop when the other flip-flop has been triggered.

The waveforms shown in FIG. 2 are representative of the voltages applied to the data interpretation circuit of FIG. 1 when used in the network of FIG. 3. The abscissa for each of these waveforms is machine displacement while the ordinate is voltage. The waveform represented by A is generated by the machine position transducer. There are numerous means familiar to those skilled in the art for generating such a position transducer signal. For example, it can be generated by shining a light through circularly oriented, equally spaced slots in a rotating disc onto a photosensitive surface. Machine displacement rotates the disc and waveform A is generated by the photosensitive surface. The waveform designated by the letter B is also generated by the machine position transducer. It is identical to waveform A, but is phase displaced 90° therefrom. Waveform B can be generated in the same manner as waveform A, by using a second photosensitive surface and directing a light on this surface through slots which are intermediate the slots used to generate waveform A.

To operate the data interpretation network, two additional waveforms are generated. These additional waveforms include a waveform designated as $\overline{A}$ generated by electrically inverting waveform A, and a waveform designated as $\overline{B}$ generated by electrically inverting waveform B.

As mentioned above the abscissa of FIG. 2 is machine displacement. When the machine is moving in one direction the waveforms A and B in effect move to the left, and when the machine moves in the opposite direction, the waveforms A and B in effect move to the right. When the waveforms A and B move to the left a first edge 25, representing an upward shift in voltage of the waveform A is generated. Continued movement of the machine in the same direction results in a second edge 26, representing an upward shift in the voltage of waveform B, followed by a third edge 27 representing a drop in the voltage of waveform A, and a fourth edge 28 representing a drop in the voltage of waveform B. Each of these edges 25-28 represents a unit distance of machine displacement which is to be added or subtracted from the machine position dimension stored in the numerical control system. Therefore, these edges must be sensed and used to generate pulses to the numerical control system. The desired pulses generated when the waveforms A and B effectively move to the left is shown by the output waveform 29. When the machine changes direction to effectively cause the waveforms A and B to move to the right the edges 25-28 are generated in reverse order. As a consequence a pulse train like that shown by the output waveform 30 is required by the numerical control system.

The electrical block diagram in FIG. 3 shows a network which will generate the pulses of waveform 29 when the machine moves in one direction, and the pulses of waveform 30 when the machine moves in the opposite direction. Referring to FIG. 3, a first interpretation circuit 31, identical to the circuit of FIG. 1, is connected to sense the first edge 25 of waveform A. This is accomplished by connecting the data input terminal 20 to receive the waveform A, connecting the inverted data input terminal 23 to receive the waveform $\overline{A}$, connecting the conditioning terminal 16 to receive the waveform $\overline{B}$, and connecting the recycle terminal 18 to receive the waveform B. The first output terminal 5 of the first flip-flop 1 will go hi each time the first edge 25 is received when the machine is moving in one direction. The first output terminal 10 of the second flip-flop 2 will go hi each time the first edge 25 is received when the machine is moving in the opposite direction.

A second interpretation circuit 32 is connected to sense the second edge 26 on the waveform B. The data input terminal 20 is connected to receive waveform B, the inverted data input terminal 23 is connected to receive waveform $\bar{B}$, the conditioning terminal 16 is connected to receive waveform $\bar{A}$, and the recycle terminal 18 is connected to receive waveform A. The first output terminal 5 of the first flip-flop 1 goes hi each time the second edge 26 is received when the machine is moving in one direction, and the first output terminal 10 of the second flip-flop 2 goes hi each time the second edge 26 is received when the machine is moving in the opposite direction.

A third interpretation circuit 33 is connected to sense the third edge 27. Its data input terminal 20 is connected to receive waveform $\bar{A}$, its inverted data input terminal 23 is connected to receive waveform A, its conditioning terminal 26 is connected to receive waveform $\bar{B}$, and its recycle terminal 18 is connected to receive waveform B. Either the first output terminal 5 or 10 goes hi each time the third edge 26 is received.

Finally, a fourth interpretation circuit 34 is connected to sense the fourth edge 28. Its data input terminal 20 is connected to receive the waveform $\bar{B}$, its inverted data input terminal 23 is connected to receive the waveform $\bar{A}$, and its recycle terminal 18 is connected to receive the waveform A. Either the first output terminal 5 or 10 goes hi each time the fourth edge 28 is received.

The output terminals 5 and 10 of the first interpretation circuit 31 are connected to two input terminals 35 and 36 of a first OR-gate 37. Likewise the output terminals 5 and 10 of the third interpretation circuit 33 are connected to input terminals 38 and 39 of the first OR-gate 37. The output terminals 5 and 10 of the second interpretation circuit 32 and the output terminals 5 and 10 of the fourth interpretation circuit 34 are connected to the respective input terminals 40, 41, 42 and 43 of a second OR gate 44.

The output of the first OR-gate 37 is connected to the input of a first monoshot circuit 45, and the output of the second OR-gate 44 is connected to the input of a second monoshot circuit 46. The monoshot circuits 45 and 46 are monostaple multivibrators familiar to those skilled in the art. When the monoshot input terminal goes hi, the circuit generates a voltage pulse at its output terminal. The duration of this pulse is chosen to match the particular needs of the numerical control system and is determined by the circuit component values used. The output terminals of the monoshot circuits 45 and 46 are connected to the respective terminals 47 and 48 of a third OR-gate 49. The output terminal 50 of the third OR-gate 49 constitutes the output terminal of the data interpretation network and is connected to the input of the numerical control system.

The first, second and third OR-gates 37, 44 and 49, and the first and second monoshot circuits 45 and 46 comprise a pulse generator 51. There are numerous alternative configurations known to those skilled in the art which accomplish the same result. It is necessary only that the pulse generator 51 be responsive to generate a pulse when a predetermined voltage level, a hi in the preferred embodiment, is applied to one of its input terminals.

Operation

To explain the operation of the data interpretation network the machine is assumed to be moving in a direction which causes the waveforms A and B of FIG. 2 to move to the left. As a consequence, the data interpretation network receives in sequence the first edge 25, the second edge 26, the third edge 27 and the fourth edge 28. Just prior to the generation of the first edge 25, the waveform B applied to the conditioning terminal 16 of the first interpretation circuit 31 is negative, thus arming both the first and second flip-flops. When the first edge 25 is received at the data input terminal 20, the first flip-flop 1 is triggered and its first output terminal 5 goes hi. This hi is conducted through the first OR-gate 37 to the input terminal of the first monoshot circuit 45, causing the first monoshot circuit 45 to generate a pulse. The pulse is transmitted through the third OR-gate 49 to the output terminal 50 where it is appropriately added to or subtracted from the machine dimension. As the machine continues to move the second edge 26 is received by the first interpretation circuit 31. When this occurs, waveform $\bar{B}$ connected to the recycle terminal 18, goes negative, thus resetting the first flip-flop 1 causing its first output terminal 5 to go lo. The circuit does not respond to the third edge 27 because the waveform B connected to the conditioning terminal 16 is positive thus preventing the first and second flip-flops from being triggered. When the fourth edge 28 is received, the waveform B goes negative and the flip-flops 1 and 2 are armed. The cycle then repeats as the first edge 25' is received.

When the machine reverses in direction, the four edges 25–28 are received by the first interpretation circuit 31 in reverse order 28, 27, 26 and 25. When operating in this reversed direction the edge 26' of waveform B goes negative and the flip-flops are armed to be triggered. Subsequently, when the edge 25' is received the waveform $\bar{A}$ applied to the inverted data input terminal 23 goes positive thus triggering the second flip-flop 2. The first output terminal 10 on the second flip-flop 2 goes hi. This is transmitted through the first OR-gate 37 to the input of the first monoshot circuit 45 which generates a pulse to the output terminal 50. When the edge 28 is subsequently received, the second flip-flop 2 is reset by the waveform $\bar{B}$ which is applied to the recycle terminal 18.

Irrespective of machine direction, when the first edge 25 or 25' is received by the first interpretation circuit 31, one of the two flip-flops 1 or 2 is triggered and the other, untriggered flip-flop, is inhibited. Consequently, if the machine reverses direction after the first edge 25' is received but before the adjacent second edge 26' or fourth edge 28 is received, the other flip-flop will not trigger to generate an erroneous pulse at the output 50 of the data interpretation network. In other words, if the machine vibrates at or near a point where the first edge 25' is generated, a single pulse only will be generated at the output terminal 50 and the remainder of the voltage shifts occurring in the waveforms A and $\bar{A}$ are ignored. Only when the machine moves a sufficient distance to cause either the second edge 26' or the fourth edge 28 to be received at the recycle terminal 18 will the first interpretation circuit 31 be reset to generate another pulse when the edge 25 or 25' occurs.

The remaining three interpretation circuits 32–34 operate in a similar manner. However, the waveforms applied to their terminals are appropriately chosen such that they generate pulses when the second, third and fourth edges 26–28 are received. Because the monoshot circuits 45 and 46 have a finite recovery time which limits the frequency response of the network, the outputs of the four interpretation circuits 31–34 are connected so that they alternately fire the first and second monoshot circuits 45 and 46. In other words, when the first edge is received the first monoshot circuit 45 generates a pulse, when the second edge 26 is received by the network the second monoshot circuit 46 generates a pulse, when the third edge 27 is received by the network the first monoshot circuit against 45 generates a pulse, and when the fourth edge 28 is received by the network the second monoshot circuit 46 again generates a pulse. The output waveform 29 shown in FIG. 2 is thus generated and appears at the output terminal 50 of the data interpretation network.

The data interpretation network of FIG. 3 also provides a convenient means of determining machine direction. When the machine is moving in one direction at least one of the first output terminals 5 of the interpretation circuits 31–34 will always be hi. Conversely, when the machine changes direction and the edges 25–28 are received by the network in reverse order, at least one of the first output terminals 10 of the four interpretation circuits 31–34 will be hi. Likewise the second output terminals 6 and 11 on the four interpretation circuits 31–34 will yield information that accurately indicates machine direction.

The data interpretation network provides an output signal for a high-resolution numerical control system. The network allows a substantial increase in system resolution with improved system accuracy.

The data interpretation network is described in such full, clear, concise and exact terms as to enable any person skilled in the art to which it pertains, or with which it is most nearly connected, to make and use the same, and sets forth the best mode contemplated by the inventors of carrying out their invention.

We claim:

1. A data interpretation circuit for detecting a voltage shift in a signal, which comprises:
   a first flip-flop circuit having a set terminal, a reset terminal, a trigger set terminal, and two output terminals;
   a second flip-flop circuit having a set terminal connected to the set terminal of the first flip-flop circuit, a reset terminal connected to the reset terminal of the first flip-flop circuit such that either flip-flop circuit can be reset by the same signal, a trigger set terminal, and two output terminals;
   a first gate having an output terminal connected to the trigger set terminal of the first flip-flop, an inhibit terminal connected to an output terminal of the second flip-flop, and a data input terminal wherein a trigger signal is generated at the output terminal of the gate when the voltages applied to the inhibit and data input terminals are at predetermined levels; and
   a second gate having an output terminal connected to the trigger set terminal of the second flip-flop circuit, an inhibit terminal connected to an output terminal of the first flip-flop, and an inverted data input terminal, wherein a trigger signal is generated at the output terminal of the second gate when the voltages applied to its inhibit and inverted data input terminals are at predetermined levels.

2. The data interpretation circuit as recited in claim 1, wherein said first and second gates are NAND gates.

3. A data interpretation circuit for a numerical control system connected to receive an A waveform which shifts voltage level periodically as a function of distance and a B waveform which is identical to the A waveform but phase displaced therefrom, which comprises:
   a pulse generator adapted to generate a voltage pulse when a hi signal is received at its input;
   a first flip-flop circuit having a set terminal connected to receive the B waveform, a trigger set terminal, a reset terminal connected to receive the inversion of the B waveform, a first output terminal connected to the input of the pulse generator, and a second output terminal;
   a second flip-flop circuit having a set terminal connected to receive the B waveform, a trigger set terminal, a reset terminal connected to receive the inversion of the B waveform, a first output terminal connected to the input of the pulse generator, and a second output terminal;
   a first gate circuit having an output connected to the trigger set terminal of the first flip-flop, an inhibit terminal connected to the second terminal of the second flip-flop circuit, and a data input terminal connected to receive the A waveform; and
   a second gate circuit having an output connected to the trigger set terminal of the second flip-flop, an inhibit terminal connected to the second output terminal of the first flip-flop circuit, and an inverted data input terminal connected to receive the inversion of the A waveform.

4. The data interpretation circuit as recited in claim 3, wherein the pulse generator is comprised of:
   an OR gate connected to receive the hi signals; and
   a monoshot circuit connected to the output of the OR gate to generate a pulse when a hi signal is received by the OR gate.

5. A data interpretation network for a numerical control system connected to receive an $\overline{A}$ waveform which shifts between a first and second voltage level periodically as a function of distance, a A waveform which is an inversion of the A waveform, a $\overline{B}$ waveform which is identical to the A waveform but phase displaced therefrom, and a B waveform which is an inversion of the B waveform, which comprises:
   a pulse generator having an output terminal and a plurality of input terminals, and adapted to produce a voltage pulse at its output terminal when a hi signal is received at one of its input terminals;
   a first data interpretation circuit having two output terminals each connected to an input terminal of the pulse generator, a conditioning terminal connected to receive the B waveform, a recycle terminal connected to receive the $\overline{B}$ waveform, a data input terminal connected to receive the A waveform, and an inverted data input terminal connected to receive the $\overline{A}$ waveform wherein a hi signal is generated at one of the two output terminals when the B waveform is at a first voltage level and the A waveform shifts voltage level;
   a second data interpretation circuit having two output terminals each connected to an input terminal of the pulse generator, a conditioning terminal connected to receive the $\overline{A}$ waveform, a recycle terminal connected to receive the A waveform, a data input terminal connected to receive the B waveform, and an inverted data input terminal connected to receive the $\overline{B}$ waveform, wherein a hi signal is generated at one of the two output terminals when the A waveform is at a second voltage level and the B waveform shifts voltage level;
   a third data interpretation circuit having two output terminals each connected to an input terminal of the pulse generator, a conditioning terminal connected to receive the $\overline{B}$ waveform, a recycle terminal connected to receive the B waveform, a data input terminal connected to receive the $\overline{A}$ waveform, and an inverted data input terminal connected to receive the A waveform, wherein a hi signal is generated at one of the two output terminals when the B waveform is at a second voltage level and the A waveform shifts voltage level; and
   a fourth data interpretation circuit having two output terminals each connected to an input terminal of the pulse generator, a conditioning terminal connected to receive the A waveform, a recycle terminal connected to receive the $\overline{A}$ waveform, a data input terminal connected to receive the $\overline{B}$ waveform, and an inverted data input terminal connected to receive the B waveform, wherein a hi signal is generated at one of the two output terminals when the A waveform is at a first voltage level and the B waveform shifts voltage level.

6. The data interpretation network recited in claim 5, wherein the first, second, third and fourth data interpretation circuits are identical and comprised of:
   a first flip-flop circuit having a set terminal, a reset terminal, a trigger set terminal, and an output terminal;
   a second flip-flop circuit having a set terminal connected to the set terminal of the first flip-flop circuit to form the conditioning terminal, a reset terminal connected to the reset terminal of the first flip-flop circuit to form the recycle terminal, a trigger set terminal, and an output terminal;
   a second flip-flop circuit having a set terminal connected to the set terminal of the first flip-flop circuit to form the conditioning terminal, a reset terminal connected to the reset terminal of the first flip-flop circuit to form the recycle terminal, a trigger set terminal, and an output terminal;
   a first gate circuit having an output terminal connected to the trigger set terminal of the first flip-flop, an inhibit terminal connected to the output terminal of the second flip-flop, and the data input terminal, wherein a trigger signal is generated at the output terminal of the gate when the voltages applied to the inhibit and data input terminals are at predetermined levels; and a second gate circuit having an output terminal connected to the trigger set terminal of the second flip-flop, an inhibit terminal connected to the output terminal of the first flip-flop, and the inverted data input terminal, wherein a trigger signal is generated at the output terminal of the second gate when the voltages applied to its inhibit and inverted data input terminals are at predetermined levels.

* * * * *

PO-1050
(5/69)

UNITED STATES PATENT OFFICE
CERTIFICATE OF CORRECTION

Patent No. 3,646,360            Dated February 29, 1972

Inventor(s) Odo J. Struger, William W. Kiffmeyer and Loren E. Shaum

It is certified that error appears in the above-identified patent and that said Letters Patent are hereby corrected as shown below:

Column 4, line 36,    "B" should read --$\overline{B}$--
Column 4, line 37,    "$\overline{B}$" should read --B--
Column 4, line 72,    "$\overline{B}$" should read --B--
Column 4, line 73,    "B" should read --$\overline{B}$--
Column 5, line 28,    "$\overline{A}$" should read --A--
Column 5, line 29,    "A" should read --$\overline{A}$--
Column 6, line 60,    "edge" should read --edge 25--
Column 7, line 62,    "second terminal" should read --second output terminal--
Column 8, line 2,    "$\overline{A}$" should read --A--
Column 8, line 4,    "A" first occurrence should read --$\overline{A}$--
Column 8, line 5,    "$\overline{B}$" should read --B--
Column 8, line 6,    "B" should read --$\overline{B}$--
Column 8, lines 63-68 should be deleted Signed and sealed this 18th day of July 1972.

(SEAL)
Attest:

EDWARD M. FLETCHER, JR.          ROBERT GOTTSCHALK
Attesting Officer                 Commissioner of Patents